United States Patent
Kawahara

[11] Patent Number: 5,549,135
[45] Date of Patent: Aug. 27, 1996

[54] BALL VALVE

[75] Inventor: Hiroto Kawahara, Tokyo, Japan

[73] Assignee: Taimei Kinzoku Kogyo Co., Ltd., Tokyo, Japan

[21] Appl. No.: 521,273

[22] Filed: Aug. 30, 1995

Related U.S. Application Data

[63] Continuation of Ser. No. 342,912, Nov. 21, 1994, abandoned.

[51] Int. Cl.$^6$ ............................ F16K 1/14; F16K 1/16; F16K 15/04
[52] U.S. Cl. ........................ 137/614.17; 137/513.3; 137/516.25; 251/175; 251/205; 251/228; 251/315.01; 251/315.16
[58] Field of Search ............................ 137/267, 521, 137/516.25, 516.27, 614.11, 614.17, 614.18, 901, 513.3, 513.5, 527, 528, 533.11; 251/158, 175, 177, 205, 215, 228, 229, 231, 235, 298, 315.01, 315.16, 318, 319

[56] References Cited

U.S. PATENT DOCUMENTS

| | | | |
|---|---|---|---|
| 2,097,285 | 10/1937 | Lundgren | 251/158 |
| 2,313,128 | 3/1943 | Densten | 251/215 |
| 3,139,811 | 7/1964 | Sickel et al. | 137/521 |
| 3,319,646 | 5/1967 | Smulka | 137/269 |
| 3,526,249 | 9/1970 | Baustian | 137/614.11 |
| 4,023,773 | 5/1977 | Wise | 251/315.01 |
| 4,073,471 | 2/1978 | Lehtinen | 251/298 |
| 4,256,283 | 3/1981 | Reneau et al. | 251/62 |
| 4,453,699 | 6/1984 | Hulsey et al. | 137/516.25 |
| 4,553,562 | 11/1985 | Nakada | 251/315.01 |
| 5,129,622 | 7/1992 | Van Rensburg et al. | 137/901 |
| 5,199,683 | 4/1993 | Le | 137/614.17 |

FOREIGN PATENT DOCUMENTS

| | | | |
|---|---|---|---|
| 2428777 | 6/1978 | France . | |
| 814978 | 8/1951 | Germany . | |
| 51-55579 | 5/1976 | Japan . | |
| 58-46267 | 3/1983 | Japan . | |
| 3-94477 | 9/1991 | Japan . | |
| 860603 | 2/1961 | United Kingdom | 251/228 |
| 2045403 | 10/1980 | United Kingdom . | |

*Primary Examiner*—George L. Walton
*Attorney, Agent, or Firm*—Heslin & Rothenberg, P.C.

[57] ABSTRACT

A ball valve disclosed herein is low cost and offers a fast and reliable valve operation. Furthermore, the actuating force the ball valve requires, when it is shut off, is small. The ball valve is capable of fine adjustment of the flow. The ball valve comprises a valve casing defining a flow path of a fluid, a valve seat disposed in the midway of the flow path, a valve element which is in engagement with the valve seat or out of engagement with the valve seat, to shut off the flow path or to regulate the flow rate in the flow path, a control rod inserted into the valve casing and movable upward and downward, and a connecting rod, one end of which is rotatably supported at the inner end of the control rod, and the other end of which is connected to the valve element. The valve element comprises a communication path which communicates with both the upstream side of the flow path and the downstream side of the flow path and an on-off means for opening or closing the communication path.

16 Claims, 6 Drawing Sheets

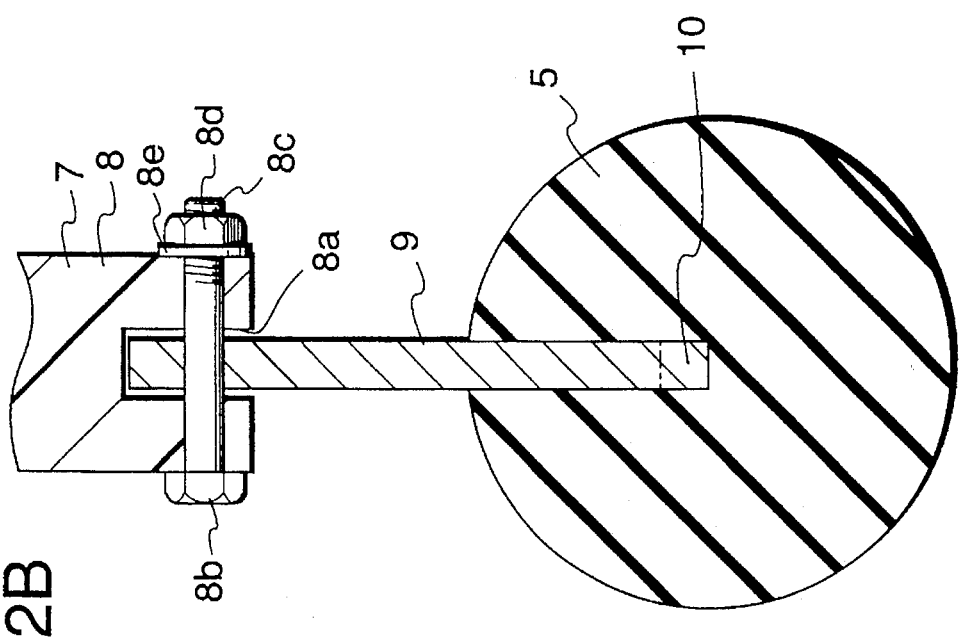
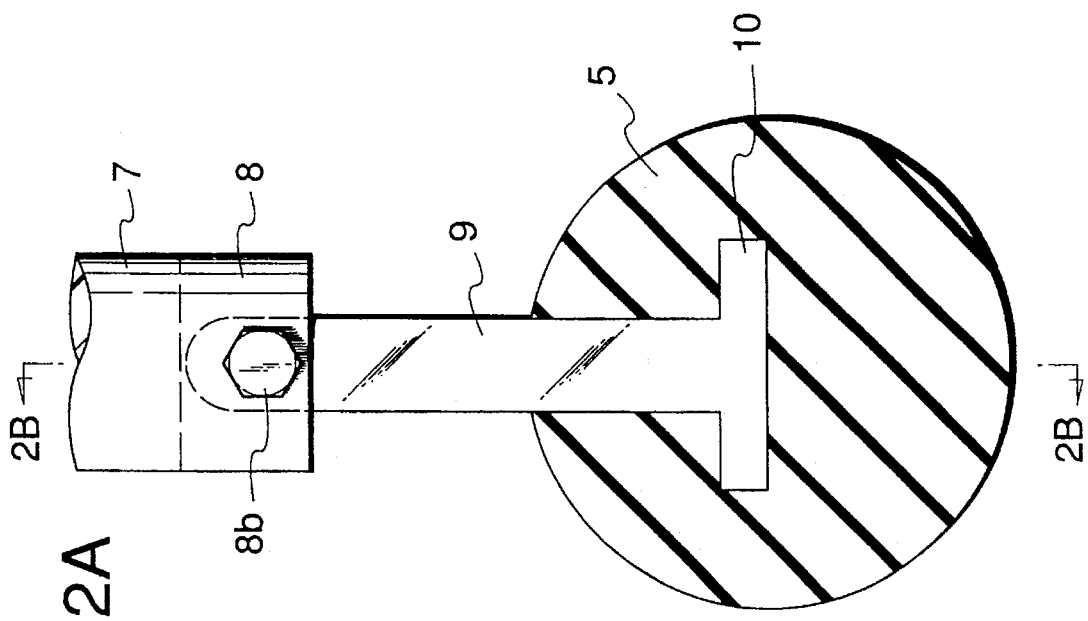

BALL VALVE

This application is a continuation of application Ser. No. 08/342,912, filed Nov. 21, 1994, now abandoned.

BACKGROUND OF THE INVENTION

1. Field of the Invention

The present invention relates to a ball valve disposed in the midway of a flow path, and, more particularly, to a ball valve which regulates a fluid flow and is used as a shut-off valve in both emergency state and normal operating state.

2. Description of the Related Art

A shut-off valve of ball valve type is conventionally well known. The ball valve, constructed of a ball-like valve and its valve seat, partitions a flow path into its upstream portion and its downstream portion of the flow path, and a path is drilled in the center of the ball-like valve, to which a control rod is linked. The control rod is rotated to allow the ball valve to shut off or adjust its flow rate.

Also available is a globe valve in which a partition board is provided in parallel with a flow path to divide it into two. A valve seat is disposed on the partition board, and a ball-like valve is vertically pressed onto the seat by means of the thread portion of a control rod connected to the valve.

The shut-off valves in the prior art, however, suffer the following problems. In the above-described ball valve, when the ball valve is shifted from its full-flow state in which the path of the valve is aligned with the flow path, to its partial-flow state in which the valve rotates to a position where a partial flow is established between the upstream and the downstream of the flow path, to a shut-off state in which the flow path is completely blocked, a fluid remains confined to the path in the valve and its relief portion. When the fluid is expanded by heat, a seal portion disposed around the control rod is damaged.

A large torque is needed to rotate the control rod, since the valve is tightly sealed onto its seat. This presents a operational difficulty. In particular, in the shut-off state of the flow path, the degree of seal between the valve element and the valve seat is extremely large because the pressure of the fluid is exerted onto the valve element. Thus, the valve seat suffers a rapid wear rate.

Foreign matter such as rust tends to be jammed between the flow path end of the valve element and the valve seat. Also, foreign matter deposited on the bottom of the relief portion has been a cause of jamming.

The ball valve subjects the flow of the fluid to curved path, causing a large energy loss.

In the globe valve, since the flow of the fluid is curved in a complex path in the valve seat portion, the loss of pressure is substantial. Thus, the number of shut-off valves in a piping system had to be properly controlled. Furthermore, since the control rod uses a screw mechanism, it takes time to complete a shut-off operation. The screw mechanism is definitely reliable, but presents a problem, particularly in an emergency situation. To shut off a high pressure fluid, a large force is directly exerted onto the control rod, and a large torque is required. The globe valve is complex in structure and costly to manufacture.

SUMMARY OF THE INVENTION

A first object of the present invention is to provide a ball valve which operates in a reliable and fast manner and which is low cost and free from the above-described problems of each valve type.

A second object of the present invention is to provide a ball valve which needs a small actuating force to release the valve from its shut-off state, which is quick to recover back pressure, and which provides a fine tuning capability of fluid flow.

To achieve above objects, the present invention comprises a valve casing defining a flow path, a valve seat disposed in the midway of the flow path inside the valve casing, a valve element which is in sealing engagement with the valve seat or out of engagement with the valve seat to completely shut off the flow path or to regulate the flow rate in the flow path, and operating means connected to the valve element for engaging the valve element with the valve seat or for disengaging the valve out of the valve seat, whereby the operating means supports the valve element in a displaceable manner in the direction of the flow of the fluid.

According to an embodiment of the present invention, the operating means comprises an operating rod, and a connecting rod, one end of which is rotatably supported at the inner end of the operating rod and the other end of which is secured to the valve element.

According to a preferred embodiment of the present invention, the valve element comprises a communication path that allows the upstream of the flow path to communicate with the downstream of the flow path, and an on-off means for opening and closing the communication path.

According to a preferred embodiment of the present invention, the on-off means comprises a medium-size valve seat disposed in the midway of the communication path, and a medium-size valve element disposed at the other end of the connecting rod, for shutting or regulating the flow of the fluid through the communication path in coordination with the medium-size valve seat.

Here in the context of this specification, the term medium-size valve element means the one relatively smaller than the already described valve element. The term medium-size is used in the same sense throughout this specification.

In the above preferred embodiment, a medium-size communication path may be disposed to communicate the communication path that is open to the upstream of the flow path, with the communication path that is open to the downstream of the flow path. The preferred embodiment further comprises a small-size valve seat in the midway of the medium-size communication path and a small-size valve element which cooperates with the small-size valve seat to completely shut off the flow path or to regulate the flow rate in the flow path. The preferred embodiment functions as a multi-phase pressure regulation type between the upstream and the downstream of the flow path. The small-size valve element may be provided with urging means made of an elastic material.

Here in the context of this specification, the term small-size valve element means the one relatively smaller than the medium-size valve element. The term small-size is used in the same sense throughout this specification.

As described above, the ball valve comprises the valve seat disposed in the midway of the flow path, the valve element which cooperates with the valve seat to completely shut off the flow path or to regulate the flow of the fluid in the flow path, and operating means connected to the valve element for engaging the valve element with the valve seat or for disengaging the valve out of the valve seat, whereby the operating means supports the valve element both in a vertically movable manner and in a displaceable manner in the direction of the flow of the fluid. The valve element thus moves in agreement with the flow of the fluid, and no undue force is exerted on the valve element. Furthermore, the valve element is free from unstable movement such as vibrating in perpendicular to the direction of the fluid flow. In a fast operation in which back flow is about to take place because of a reversed pressure relationship between the upstream side and the downstream side of the flow path, the valve element moves to be in engagement with the valve seat and check the back flow. The ball valve is simple in structure and low cost.

The inner end of the control rod is connected to one end of the rigid connecting rod in a manner that the connecting rod is rotated. The other end of the connecting rod is rigidly connected to the valve element. Even when the pressure on the upstream side is released, it is possible to block the fluid on the downstream by mechanically pressing beforehand the control rod against the valve seat on the downstream side.

When the pressure on the downstream side get larger than the pressure on the upstream side and when a force exerted on the valve element overpowers the mechanical force exerted beforehand onto the control rod to press it against the downstream valve seat, the valve element is shifted onto the upstream valve seat to check a back flow.

Since the valve element is provided with the communication path that is open to both the upstream and downstream of the flow path, and the on-off means for opening or closing the communication path, the ball valve can release the upstream pressure in cooperation with already-mentioned functions. The force required for release operation during shut-off is reduced. Since the on-off means is constructed of the medium-size valve seat disposed in the valve element and the medium-size valve element disposed on the other end of the connecting rod, the on-off means is simple in structure and offers a reliable operation.

As already described, the ball valve comprises the medium-size communication path disposed in the medium-size valve element, the small-size valve seat disposed in the midway of the medium-size communication path, and the small-size valve element that cooperates with the small-size valve seat. The ball valve functions in a multi-phase pressure regulation fashion between the upstream and downstream of the flow path. Along with the already-described functions, the ball valve is able to perform pressure release in a multi-phase manner by activating sequentially first the small-size valve element, medium-size valve element, and then the normal valve element.

Provided with the urging means made of spring and the like, the medium-size valve element permits fine movement and thus fine adjustment of flow rate. If an external force used to adjust the medium-size valve element is exerted for some time, the flow set can be maintained even after the external force is removed.

A more complete understanding of the present invention can be obtained by reference to the following detailed description of the preferred embodiments thereof in connection with the attached drawings.

DESCRIPTION OF THE DRAWINGS

FIG. 2A is a front view showing the connection of the valve element with the control rod and the connection rod shown in FIG. 1, with a portion broken away.

FIG. 2B is a cross-sectional view taken along the line 2B—2B in FIG. 2A.

DETAILED DESCRIPTION OF THE PREFERRED EMBODIMENTS

Figure 1:
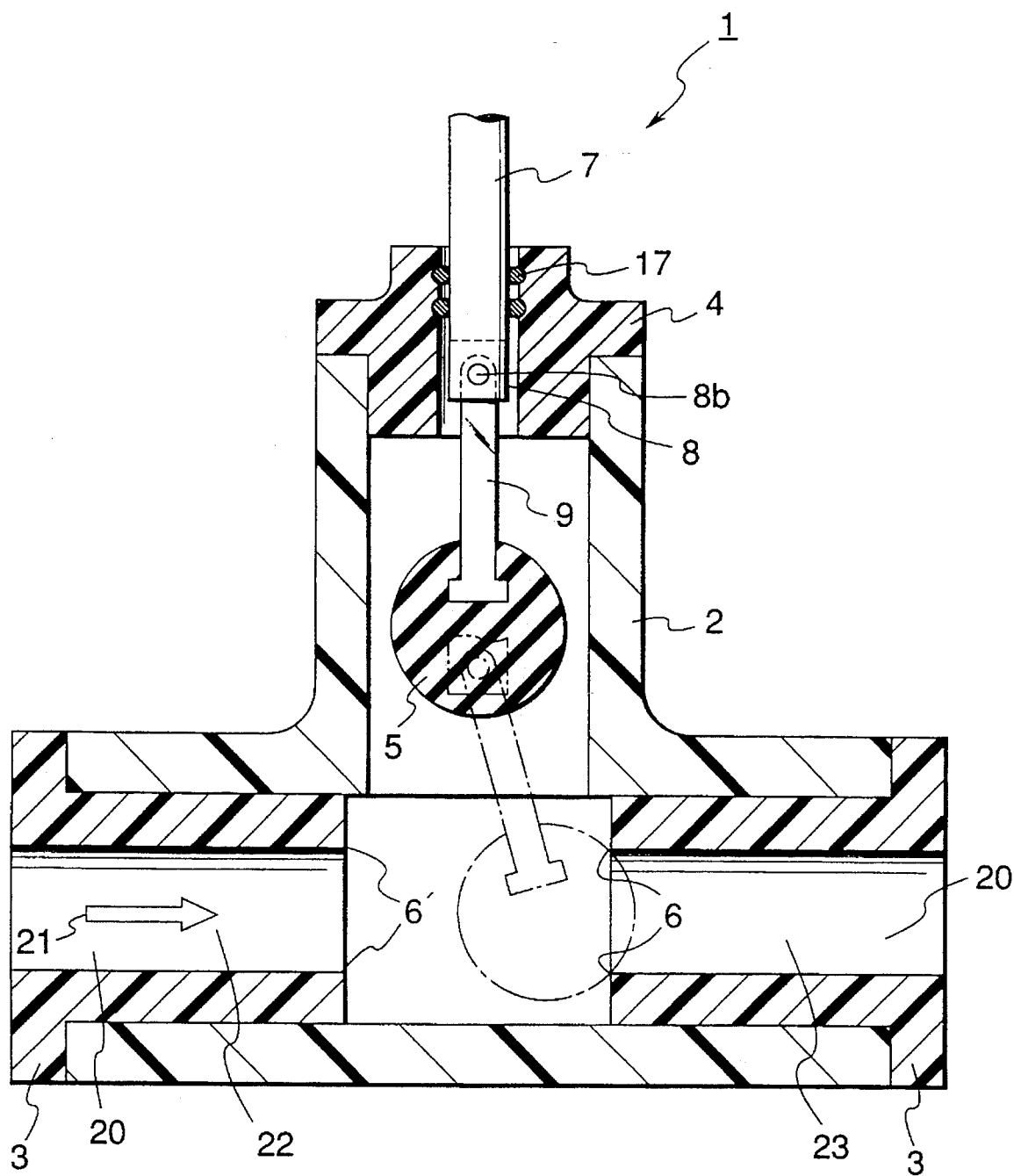
FIG. 1 is a cross-sectional view of an embodiment of the ball valve of the present invention, with certain parts omitted.

Referring to FIG. 1, a ball valve 1 according to the present invention comprises a flow path 20 in a horizontal direction and a cylindrical valve casing 2 that defines a vertically extending hollow portion 24. The horizontal portion of the valve casing 2 receives sleeves 3, 3, and the top of the vertical portion of the casing 2 is fitted with a lid 4. Both sleeves 3, 3 constitute at their inner ends valve seats 6, 6'. A control rod 7 is inserted into the valve casing 2 via seals 17, 17. The bottom end 8 of the control rod 7 has a socket portion 8a, which receives one end of a connecting rod 9. The connecting rod 9 is connected to the socket portion 8a with a pin 8b. The pin 8b has a threaded portion 8c, and a nut 8d and a washer 8e are screwed around the threaded portion 8c of the pin 8b to prevent the pin 8b from coming off. As shown in FIG. 2A, the other end 10 of the connecting rod 9 is a flange portion and rigidly attached to a ball-like valve element 5. Since the ball valve 1 according to the present invention employs the sleeves 3, 3, some degree of flexibility is allowed in determination of material selection and machining accuracy of the sleeves. A commercially available T-type fitting may be used for the casing 2, resulting in a low material cost.

The ball-like valve element 5 may be constructed of rubber, resin, metal. The ball-like valve element 5 may be a metal ball lined with rubber or resin. The material of the ball valve element 5 is mutually different from that of the valve seat 6, 6'. Specifically, if the ball-like valve element is constructed of a rigid material such as metal, the valve seats 6, 6' that are engaged with the ball-like element are constructed of an elastic material. If the ball-like valve element is constructed of an elastic material, the valve seats 6, 6' are constructed of a rigid material.

Figure 3:
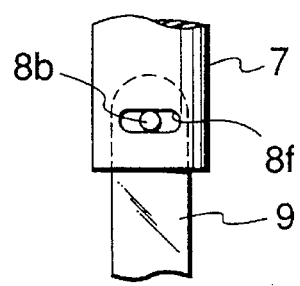
FIG. 3 is an enlarged front view of the structure of one end of the control rod according to another embodiment of the present invention.

FIG. 3 shows another structure of the end portion 8 of the control rod 7, wherein the pin 8b at one end of the connecting rod 9 is movable within an elongated opening 8f to allow some degree of play. This structure increases even sealing of the valve element 5 circumferentially around the valve seats 6, 6'.

In FIG. 1, the ball-like valve element 5 is connected to the control rod 7 via the connecting rod 9 that is connected to the end 8 by the pin 8b as shown in FIG. 2 and FIG. 3. The ball-like valve element 5 is vertically moved as the control rod 7 is moved. The ball-like valve element 5 together with the connecting rod 9 is also rotatably supported around the pin 8b so that the valve element 5 is displaceable in the direction of the flow path. The ball-like valve element is thus movable in the combined vertical and horizonal movement. In the event of an emergency requiring an immediate shut-off of the flow path, the control rod 7 is lowered to allow the valve element 5 to be subjected to dynamic pressure of the fluid flowing from the upstream side 22 to the downstream side 23, and the valve element 5 is put in sealing engagement with the valve seat 6 to shut off the flow path 20. One of both the valve element 5 and the valve seats 6 is rigid while the other of both is elastic and the connection structure shown in FIG. 3 permits additionally some degree of freedom in motion of the valve element 5. These arrangements help ensure a complete shut-off of the flow path 20. Since the valve element 5 is allowed to move vertically and horizontally along the flow of fluid, the valve element 5 suffers practically no swing in perpendicular to the direction of the flow of fluid. Thus, the motion of the valve element 5 is stable.

A rigid connecting rod 9 connects the valve element 5 to the control rod 7. When the control rod 7 is further lowered with the valve element 5 shutting off the flow path 20, a couple is exerted on the pin 8b and on the lower edge of the valve seat 6 of the downstream side. In addition to the force of the pressure of fluid flow, the mechanical force via the control rod 7 is thus additionally exerted onto the valve element 5 in a manner that allows the valve element 5 to be further pressed against the valve seat 6. If the pressure on the upstream side 22 happens to drop below that on the downstream side 23 for some reason, the valve element 5 stays engaged with the valve seat 6 continuously keeping shut off the flow path 20.

Another situation may be contemplated where the valve element 5 keeps the flow path 20 shut off by means of the pressure of fluid only. In this case, when the pressure on the downstream side 23 exceeds the pressure on the upstream side the valve element 5 is disengaged from the upstream valve seat 6, shifted to the downstream valve seat 6', and engaged with the downstream valve seat 6' to check a back flow. This prevents an accidental situation.

Figure 4:
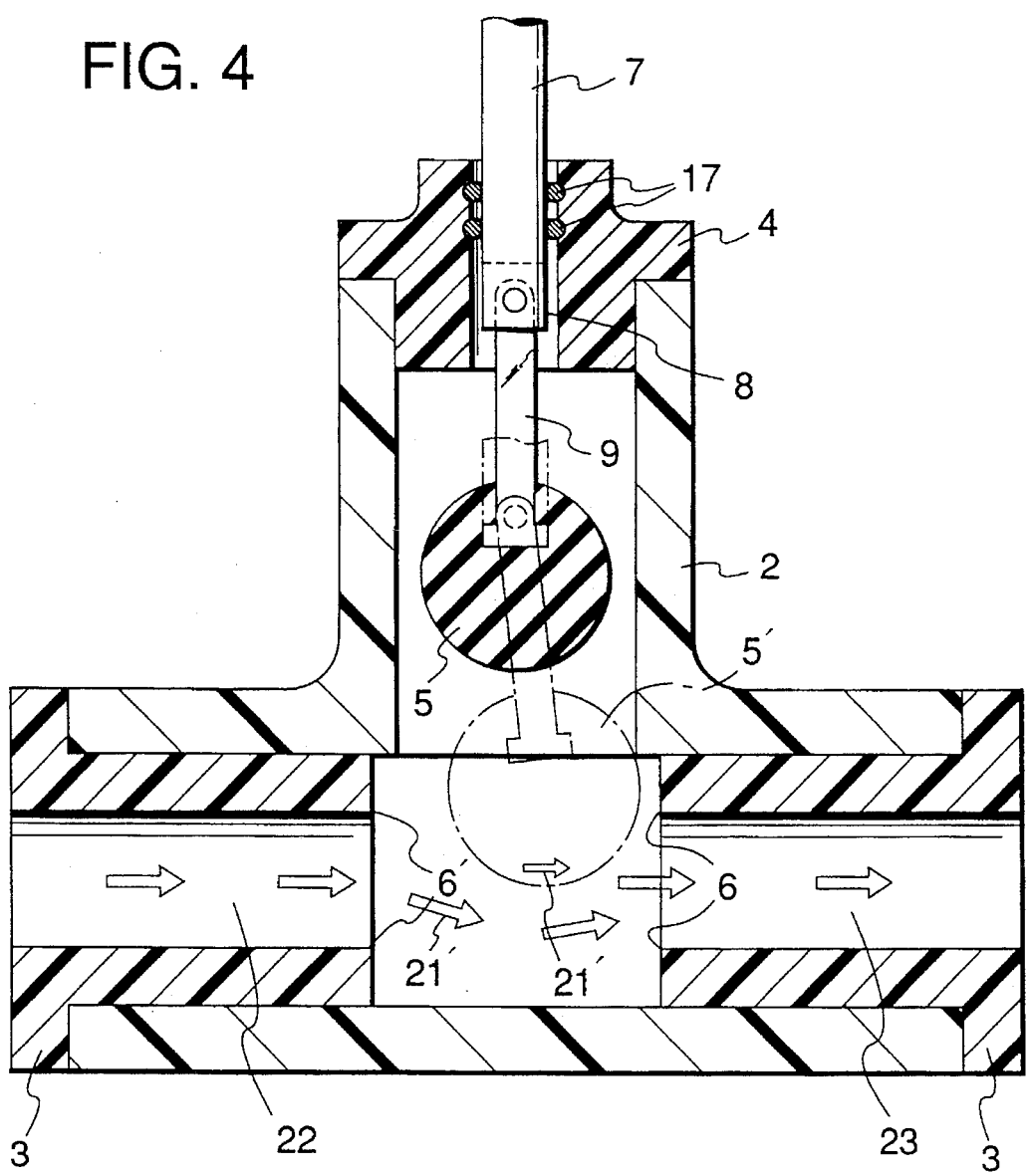
FIG. 4 is a cross-sectional view showing a partially opened state of the ball valve of FIG. 1, with certain parts omitted.

Besides the shut-off operation, the ball valve according to the present invention may be applied for regulating the flow rate of a fluid. As shown in FIG. 4, the control rod 7 is left lowered to a middle position rather than to a fully lowered position sufficient enough for the valve element 5 to shut off the flow path 20. With the valve element 5 at the middle position, the valve element 5 is put into a partial engagement with the valve seat 6. The degree of engagement determines the flow rate of the fluid, and thus the flow rate is regulated. Since the streamline 21' of the fluid is formed along the spherical surface of the valve element 5, the streamline 21' is smooth as shown in FIG. 4. A low pressure-loss flow rate regulation is thus achieved.

Figure 5:
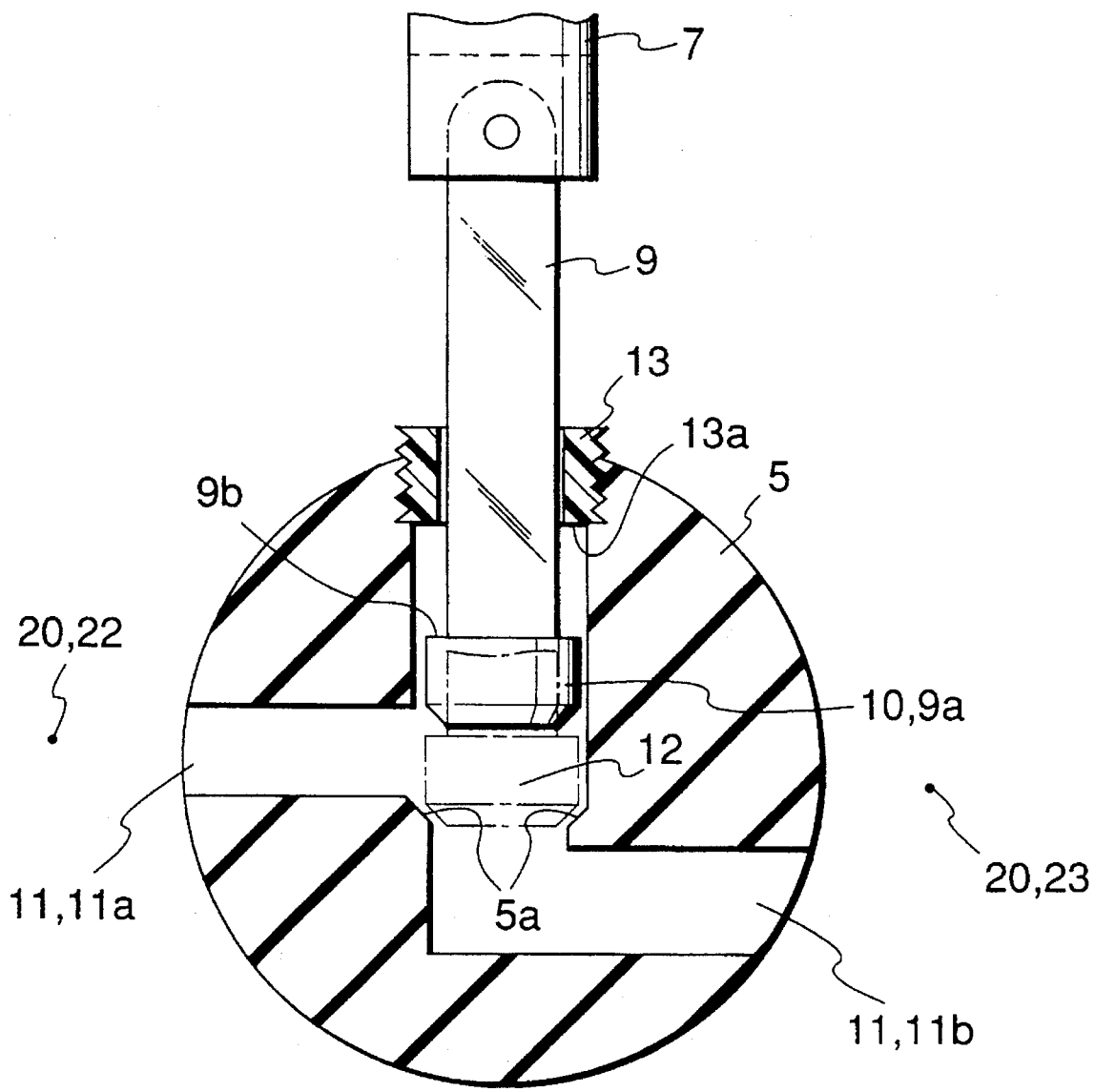
FIG. 5 is a front view showing an embodiment of a communication path disposed in the valve element and the on-off means for the communication path according to the present invention, with a portion broken away.

FIG. 5 shows another embodiment. Disposed in the valve element 5 is a communication path 11 which is open to both the upstream side 22 and the downstream side 23 of the flow path 20. The communication path 11 is made up of a communication path 11a that open to the upstream side 22 and a communication path 11b that is open to the downstream side 23. The communication path 11 has on-off means 12 between the communication path 11a and the communication path 11b. The on-off means 12 in this embodiment is of a structure similar to conventional ball valves, and comprises a medium-size valve element 9a and a medium-size valve seat 5a with which the medium-size valve element 9a is engaged. The medium-size valve element 9a is provided with a stopper 9b which prevents the connecting rod 9 from coming off from the valve element 5. The stopper 9b abuts the underside 13a of a nut 13 that is screwed into the valve element 5.

Figure 6:
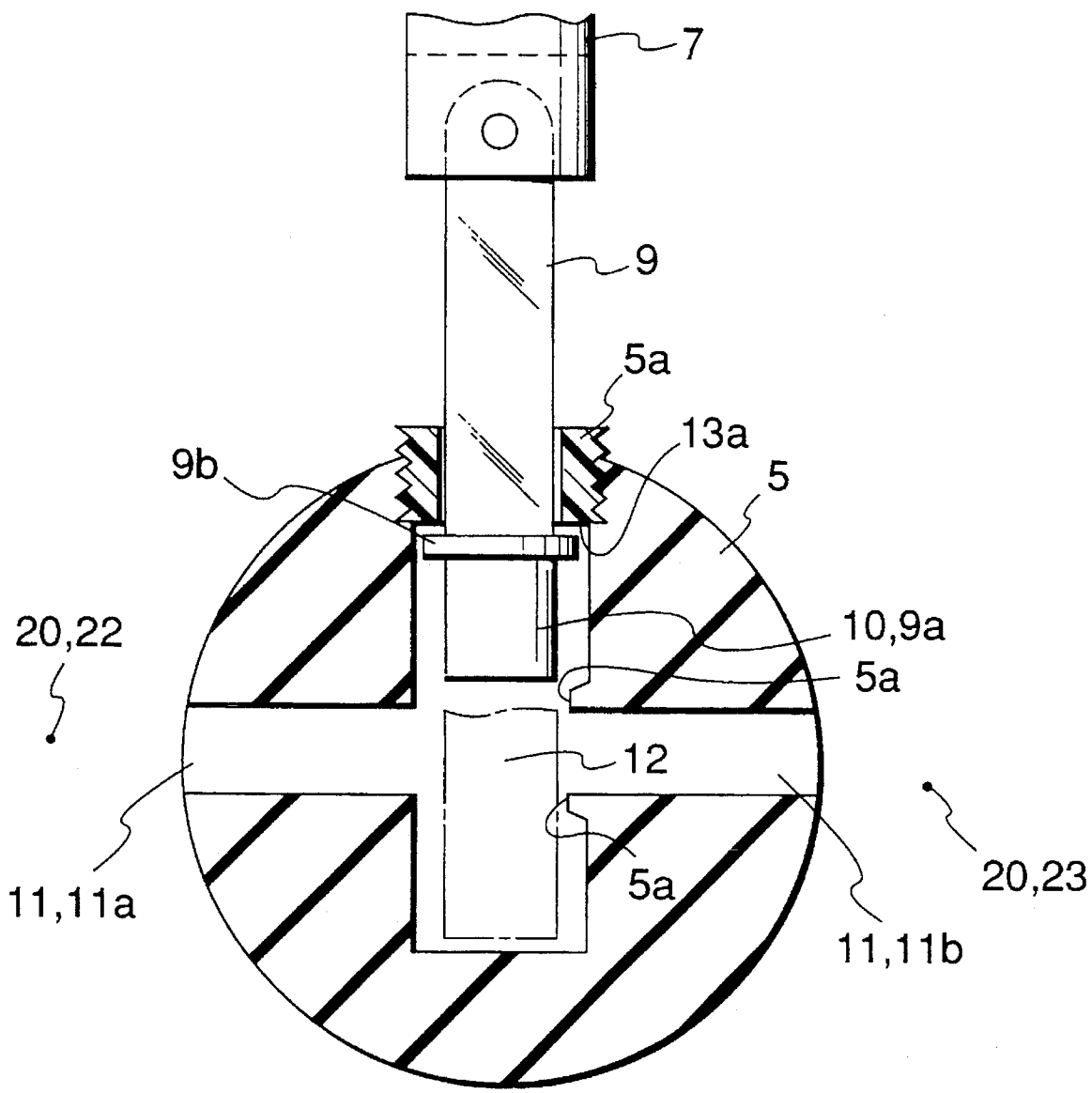
FIG. 6 is a front view showing another embodiment of a communication path disposed in the valve element shown in FIG. 5 and the on-off means for the communication path, with a portion broken away.

FIG. 6 shows another embodiment of a communication path and its on-off means disposed in the valve element of FIG. 5. In this embodiment, a medium-size valve element 9a and a medium-size valve seat 5a are of a structure similar to that of a sluice valve. Since the remainder of the structure remain unchanged from the embodiment shown in FIG. 5, identical or similar parts are designated with the same reference numerals, and their description is omitted. The on-off means is not limited to the ball valve and the sluice valve shown in FIG. 5 and FIG. 6, respectively. For example, on-off means similar to a cock, a needle valve or a plug valve may be an acceptable alternative. Alternatively, an on-off means constructed of an electrically controlled solenoid valve built in the valve element 5 will equally work.

Figure 7:
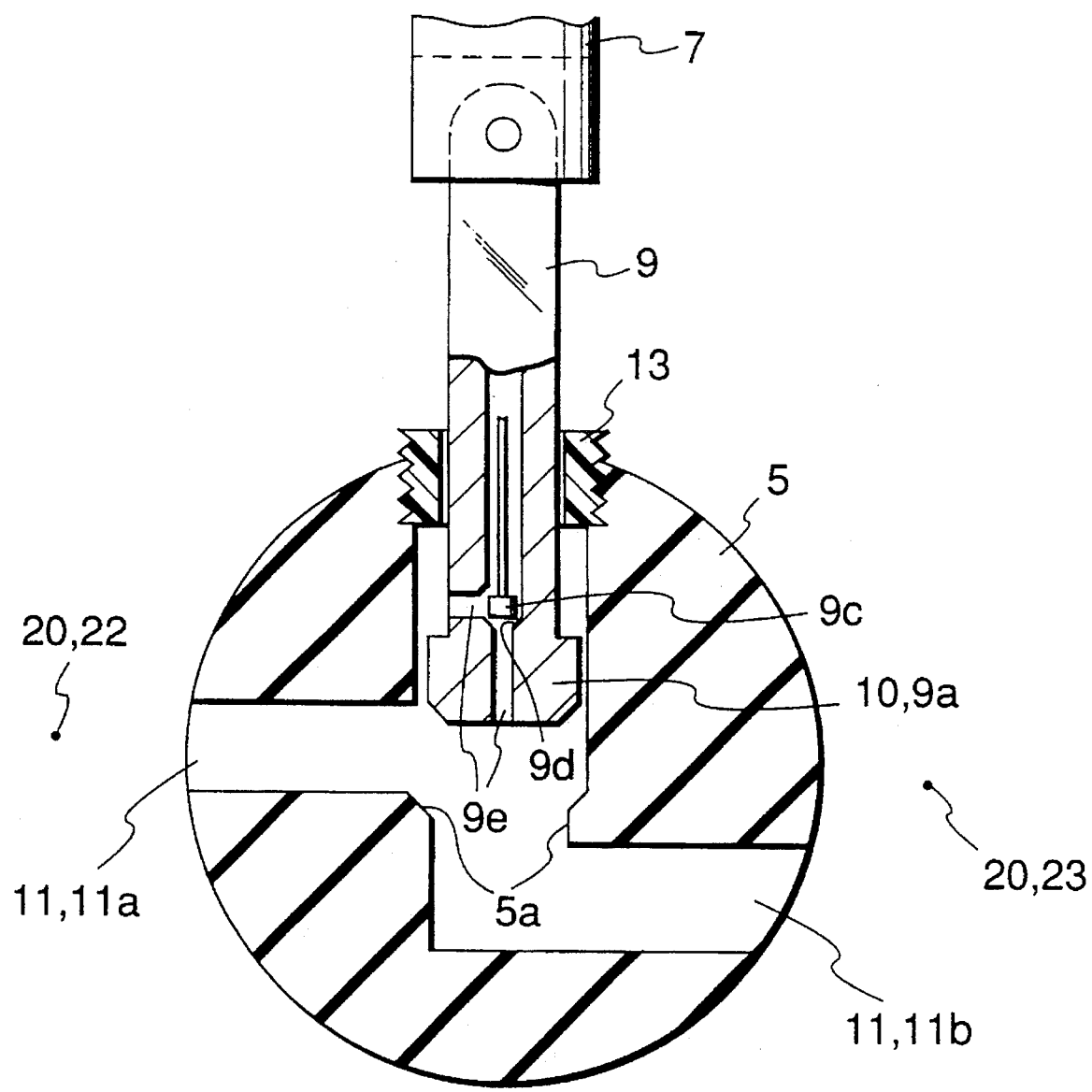
FIG. 7 is a front view showing an embodiment of a medium-size communication path disposed in a medium-size valve element, a small-size valve seat and a small-size valve element housed in the valve element according to the present invention.

FIG. 7 shows still another embodiment. Disposed in the medium-size valve element 9a in FIG. 5 is a medium-size communication path 9e which communicates with a communication path 11a open to the upstream side and with a communication path 11b open to the downstream side. Disposed in the midway in the medium-sized path 9e are a small-size valve seat 9d and a small-size valve element 9c in order to perform pressure regulation between the upstream side 22 and the downstream side 23 of the flow path in a multi-phase manner.

According to the ball valve 1 of the present invention, the inner bottom of the valve casing 2 is directly washed by the fluid flow, when the ball valve 1 is opened. Even in its closed state, the ball valve 1 allows its inner bottom portion to be in contact with the fluid of the upstream side. The ball valve 1 is thus free from stagnation of fluid, sedimentation and build-up on the inner bottom of the casing, which the conventional ball valve has suffered from.

In a ball valve of the type according to the present invention, the problem is a large force that is required to put the valve element 5 out of disengagement with the valve seat 6 when the ball valve 1 is to be released after an emergency shut-off. For example, assume that a pressure of 10 kgf/cm$^2$ is exerted on a valve seat of 10 cm inner diameter. This pressure is translated into a force of 785 kgf. This cannot be manually released. Since the ball valve 1 according to the present invention comprises the communication path 11 disposed inside the valve element 5 and the on-off means 12 for opening or closing the communication path 11, a relatively small force is sufficient enough to release the shut valve. In FIG. 5, by allowing the control rod 7 to disengage the medium-sized valve element 9a from the medium-sized valve seat 5a, the fluid flows from the upstream side 22 to the downstream side 23, the downstream pressure as a back pressure for the valve element rises, and the differential pressure between the upstream side 22 and the downstream side 23 lessens. As a result, the force required to release the shut valve is relatively small. Because of its relatively small diameter, the medium-sized valve element 9a is subjected to relatively small pressure of the fluid, and thus the control rod 7 is easily manually manipulated.

In FIG. 6, the sluice valve replaces the ball valve of FIG. 5. The medium-sized valve element 9a and the medium-sized valve seat 5a are controlled to shut off or regulate the flow of the fluid, increasing the downstream pressure that is the back pressure of the valve element. The stopper 9b at one end 10 of the connecting rod 9 prevents the connecting rod 9 from coming off from the valve element.

The on-off means shown in FIG. 5 and FIG. 6 are particularly effective if the flow is an incompressible liquid. In the incompressible fluid, a slight release of pressure is enough to recover the back pressure of the valve element. Furthermore, if the medium-sized valve element is urged by urging means made of elastic material such as spring, it may be easy to displace the medium-sized valve element in a small increment. Thus, fine adjustment of flow rate is possible. For example, the medium-sized valve element 9a is always urged toward the upstream side by a spring. The flow path is blocked when the medium-sized valve element 9a is pressed downward. When released, the medium-sized valve element 9a is raised, allowing a slight current to flow along the flow path.

Although the present invention has been discussed in connection with the illustrated embodiments in detail, it will be understood that the present invention is not limited to the above embodiments and that various modifications and changes are made without departing from the scope and spirit of the present invention.

What is claimed is:

1. A ball valve comprising:
    a valve casing defining a generally longitudinal fluid flow path:
        at least one valve seat disposed in the midway of said fluid flow path inside the valve casing;
        a ball shape valve element for shutting of said fluid flow path and regulating the amount of fluid flowing in said fluid flow path in cooperation with said valve seat, said ball shape valve having a controlled valving communication path disposed within the interior of said valve element and extending there through substantially in the direction of said fluid flow path;
    operating means connected to said valve element for moving said valve element in one direction transverse to said fluid flow path and allowing displacement of said element in the direction of the flow of the fluid for engaging with said valve seat and disengaging said valve element from said valve seat when said operating means is moved in a second direction, said operating means comprising a control rod inserted into said valve casing for transverse movement relative to said fluid flow path and a connecting rod having one end pivotally supported at an inner end of said control rod and an other end inserted within a substantially tubular bore disposed within said valve element, said other end providing said controlled valving within said communication path by movement of said connecting rod a predetermined distance within said communication path while said valve element is seated, said connecting rod being pivotable as said valve element is displaced within said fluid flow path by said fluid flow for cooperation with said valve seat.

2. The ball valve according to claim 1, wherein said valve element has a passage therein for guiding said connecting rod, said other end of said connecting rod having flange portions for holding said connecting rod within said valve element.

3. The ball valve according to claim 2, wherein the control rod has a socket portion, which receives one end of the connecting rod, and a pin connects the control rod to the connecting rod.

4. The ball valve according to claim 2, wherein an elongated opening is formed on one end of the connecting rod so that a pin that is moveable within the elongated opening connects the control rod to the connecting rod.

5. The ball valve according to claim 1, wherein said communication path communicates an upstream side of the flow path with a downstream side of the flow path therein, and comprises medium-size valve seats disposed in the midway of said communication path, said connection rod acting as a medium size valve element in connection with said medium-size valve seats for shutting off and regulating the flow of the fluid in said communication path.

6. The ball valve according to claim 5 wherein the communication path within said ball valve comprises a medium-size communication path communicating with said communication path open to the upstream side and communicating with said communication path open to the downstream side in the medium-size valve element, a small-size valve seat disposed in the midway of the medium-size communication path, and a small size valve element which, in cooperation with the small-size valve seat for controlling the flow of the fluid flow in the medium-size communication path, whereby pressure regulation between the upstream of the flow path and the downstream of the flow path is performed in a multi-phase manner.

7. The ball value according to claim 5, wherein said medium-size valve element is provided with urging means activated by an elastic material.

8. A ball valve comprising:
    a cylindrical valve casing having a longitudinal wall portion defining a longitudinal fluid flow path and a transverse wall portion defining a hollow portion;
    sleeves fitted in the inside of said longitudinal wall portion and valve seats disposed on each inner end of said sleeves;
    a ball shaped valve element for shutting of said fluid flow path and regulating an amount of fluid flow in said fluid flow path in cooperation with at least one of said valve seats;
    a lid covering an open end of the transverse wall portion of said casing;
    a control rod inserted into said valve casing through said lid from outside and moveable in said hollow portion for moving said valve element in a direction transverse to said fluid flow path;
    a connecting rod having one end pivotally supported at an inner end of said control rod and an other end inserted within said valve element, said connecting rod being pivotable as said valve element displaces in the fluid flow direction;
    said valve element having a passage therein for guiding said connecting rod, and a stopper disposed around an outer end of said passage, said other end of said connecting rod having a flange portion moveable a predetermined distance within said passage, wherein said flange portion engages said stopper for displacing said valve element away from said valve seating to control the fluid flow through said fluid flow path.

9. The ball valve according to claim 8, wherein the control rod has a socket portion, which receives one end of the connecting rod, and a pin connects the control rod to the connecting rod.

10. The ball valve according to claim 8, wherein an elongated opening is formed on one end of the connecting rod and a pin that connects the control rod to the connecting rod is moveable within the elongated opening.

11. The ball valve according to claim 10, wherein said valve element is constructed of a rigid material and said valve seat is constructed of an elastic material.

12. The ball valve according to claim 10, wherein said valve element is constructed of an elastic material and said valve seat is constructed of a rigid material.

13. The ball valve according to claim 8, wherein said valve element comprises a communication path communicating an upstream side of the flow path with a downstream side of the flow path therein, and medium-size valve seats disposed in the midway of said communication path, said connecting rod acting as a medium-size valve element in connection with said medium-size valve seats for shutting off and regulating the flow of the fluid in said communication path.

14. The ball valve according to claim 13 further comprising a medium-size communication path communicating with said communication path open to the upstream side and communicating with said communication path open to the downstream side in the medium-size valve element, a small-size valve seat disposed in the midway of the medium-size communication path, and a small-size valve element which, in cooperation with the small-size valve seat, shuts off and regulates the flow of the fluid in the medium-size communication path, whereby pressure regulation between the upstream of the flow path and the downstream of the flow path is performed in a multi-phase manner.

15. The ball valve according to claim 13, wherein said medium size valve element is provided with urging means activated by an elastic material.

16. A ball valve comprising:

a valve casing defining a generally longitudinal fluid flow path;

valve seats disposed in the midway of said fluid flow path inside the valve casing;

a ball shaped valve element for shutting of said fluid flow path and regulating the amount of fluid flow in said fluid flow path in cooperation with said valve seats depending on the direction of fluid flow in said fluid flow path;

operating means connected to said valve element for moving said valve element in one direction transverse to said fluid flow path and allowing displacement of said element in the direction of the flow of the fluid for engaging with said valve seats and disengaging said valve element from said valve seats when said operating means is moved in a second direction said operating means comprising a control rod to be inserted into said valve casing for transverse movement relative to said fluid flow path and a connecting rod having one end rotatably supported at the inner end of said control rod and an other end inserted within said valve element, said connecting rod being pivotable as said valve element is displaced within said fluid flow path for cooperation with said valve seats;

said valve element having a communication path communicating an upstream side of the flow path with a downstream side of the flow path, and medium size valve seats disposed in the midway of said communication path, said connecting rod acting as a medium size valve element in connection with said medium size valve seats for shutting off and regulating the flow of the fluid in said communication path; and a medium-size communication path disposed in the medium-size valve element for communicating with said communication path open to the upstream side and communicating with the communication path open to the downstream side, a small-size valve seat disposed in the midway of the medium-size communication path, and a small-size valve element which, in cooperation with the small size valve seat, shuts off and regulates the flow of the fluid flow in the medium-size communication path, whereby pressure regulation between the upstream of the flow path and the downstream of the flow path is performed in a multi-purpose manner.

\* \* \* \* \*